(12) United States Patent
Yoo (10) Patent No.: US 12,333,298 B2
(45) Date of Patent: Jun. 17, 2025

(54) STEERING CONTROL DEVICE AND METHOD

(71) Applicant: HL MANDO CORPORATION, Gyeonggi-do (KR)

(72) Inventor: Manjae Yoo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 231 days.

(21) Appl. No.: 18/077,620

(22) Filed: Dec. 8, 2022

(65) Prior Publication Data

US 2023/0174146 A1 Jun. 8, 2023

(30) Foreign Application Priority Data

Dec. 8, 2021 (KR) .................. 10-2021-0174403

(51) Int. Cl.
*G06F 8/656* (2018.01)
*B62D 6/00* (2006.01)

(52) U.S. Cl.
CPC .............. *G06F 8/656* (2018.02); *B62D 6/00* (2013.01); *G06F 2212/173* (2013.01)

(58) Field of Classification Search
CPC ....... B62D 6/00; G06F 8/65; G06F 2212/173; G06F 8/656
See application file for complete search history.

(56) References Cited

U.S. PATENT DOCUMENTS

2024/0126528 A1* 4/2024 Mizuhashi .............. G06F 8/656

FOREIGN PATENT DOCUMENTS

WO WO-2017178211 A1 * 10/2017
WO WO-2021075361 A1 * 4/2021 ............... G06F 8/65

* cited by examiner

*Primary Examiner* — Mark L. Greene
(74) *Attorney, Agent, or Firm* — WOMBLE BOND DICKINSON (US) LLP

(57) ABSTRACT

The embodiments relate to a steering control device and method. Specifically, a steering control device according to an embodiment may include a first steering control module configured to delete a stored first code flash and store an update file according to an over-the-air (OTA) update when receiving an OTA update request, and a second steering control module to which a control right is transitioned from the first steering control module if the first steering control module receives the OTA update request.

9 Claims, 7 Drawing Sheets

STEERING CONTROL DEVICE AND METHOD

CROSS REFERENCE TO RELATED APPLICATION

This application claims priority from Korean Patent Application No. 10-2021-0174403, filed on Dec. 8, 2021, which is hereby incorporated by reference for all purposes as if fully set forth herein.

TECHNICAL FIELD

Embodiments of the present disclosure relate to a steering control device and method.

Recently, the electrical system of automobiles has been increasingly advanced. Accordingly, there may be occurred an increase in electronic control units (ECUs), an increase in mutual data communication between devices, and complexity of ECU-mounted software. This may cause an increase in the probability of occurrence of software errors.

As a way to solve this problem, the ECU OTA (Over The Air) function can be applied to the vehicles such as electric vehicles. In addition, an increasing number of OEMs are requesting OTA functions to be installed in consideration of future software updates and A/S.

The ECU may stop operating when performing a software update on an ECU through a communication means, and there is a demand to solve this problem.

SUMMARY

In this background, embodiments of the present disclosure provide a steering control device and method for transferring the control right to a second steering control module and maintaining the control right of the vehicle by updating a first steering control module.

In an aspect of the present disclosure, there is provided a steering control device including a first steering control module configured to delete a stored first code flash and store an update file according to an over-the-air (OTA) update when receiving an OTA update request, and a second steering control module to which a control right is transitioned from the first steering control module if the first steering control module receives the OTA update request.

In another aspect of the present disclosure, there is provided a steering control method including receiving, by a first steering control module, an over-the-air (OTA) update request, transitioning, by a first steering control module, a control right from the first steering control module to a second steering control module, and deleting a stored first code flash and storing an update file, and transitioning the control right from the second steering control module to the first steering control module if the first steering control module completes an OTA update.

According to embodiments of the steering control device and method according to the present disclosure, since the control right of the vehicle is maintained when an OTA update is performed, the update can be performed at any time regardless of the vehicle's driving situation.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a steering control device 10 according to an embodiment of the present disclosure with reference to the accompanying drawings.

Figure 1:
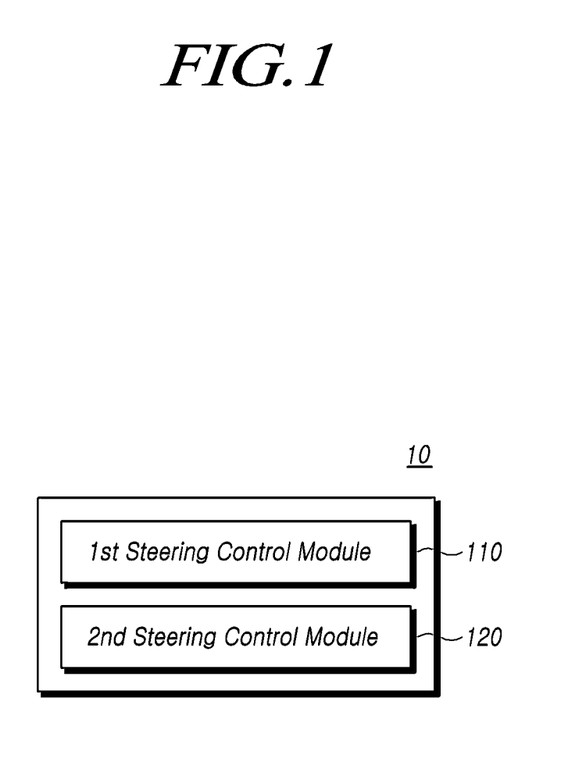
FIG. 1 schematically illustrates a steering control device according to an embodiment of the present disclosure.

FIG. 1 schematically illustrates a steering control device 10 according to an embodiment of the present disclosure.

Referring to FIG. 1, a steering control device 10 according to an embodiment of the present disclosure may include a first steering control module 110 and a second steering control module 120.

The steering control device 10 may calculate a steering assist force according to a rotation angle of a steering wheel operated by a driver and control steering devices mounted in a vehicle to provide the calculated steering assist force to a steering wheel.

This steering control device may be, according to a driving method to provide steering assistance power, a hydraulic power steering (HPS) system for providing steering assistance by turning a pump to generate hydraulic pressure, or an electronic power steering (EPS) system for providing steering assistance by driving a motor. Hereinafter, in this specification, for convenience, there is described based on the electric power steering device, but is not limited thereto.

The steering control device 10 may download an update file for controlling the electric steering device. Such an update file may be downloaded from a server (not shown) outside the vehicle to the steering control device through an over-the-air (OTA) manner or an OTA programming manner.

Figure 2:
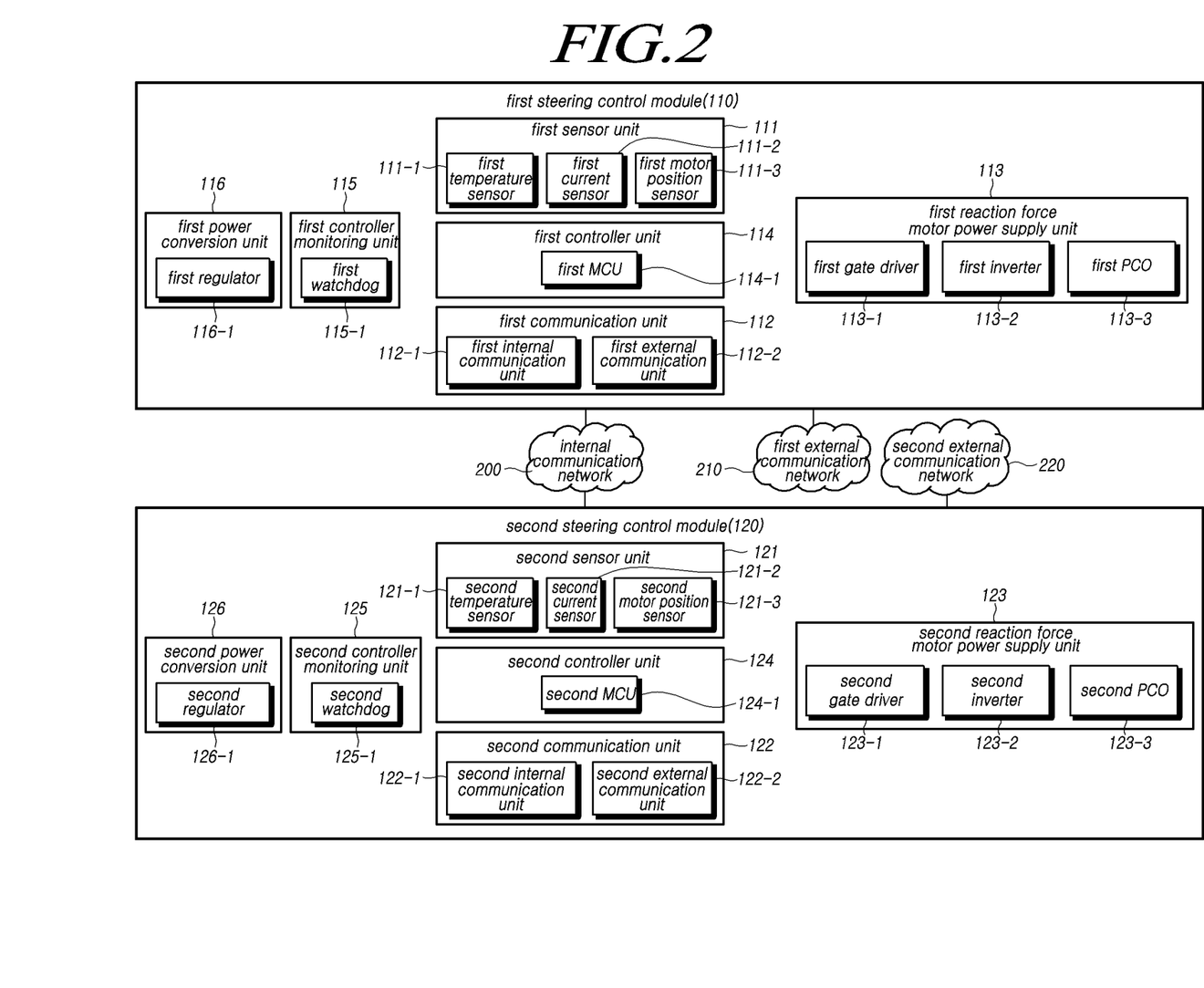
FIG. 2 illustrates a steering control device according to an embodiment of the present disclosure in more detail.

FIG. 2 illustrates a steering control device 10 according to an embodiment of the present disclosure in more detail.

Referring to FIG. 2, the steering control device 10 according to the present disclosure may include a first steering control module 110 and a second steering control module 120. Here, the first steering control module 110 may include a first sensor unit 111, a first communication unit 112, a first steering motor power supply unit 113, a first controller 114, a first controller monitoring unit 115, a first power conversion unit 116 and the like.

In addition, the second steering control module 120 may include a second sensor unit 121, a second communication unit 122, a second steering motor power supply unit 123, a second controller 124, a second controller monitoring unit 125, a second power conversion unit 126, and the like.

In particular, since the first sensor unit 111, the first communication unit 112, the first steering motor power supply unit 113, the first controller 114, and the first controller monitoring unit 115 and the first power conversion unit 116 of the first steering control module 110 may have the same configuration as the second sensor unit 121, the second communication unit 122, the second steering motor power supply unit 123, the second controller 124, the second controller monitoring unit 125 and the second power conversion unit 126 of the second steering control module 120, respectively, it will be described only components of the first steering control module 110 for simplicity of description.

The first sensor unit 111 may include a first temperature sensor 111-1, a first current sensor 111-2, a first motor position sensor 111-3, and the like, but is not limited thereto, and may include another sensor for detecting the state of the vehicle's steering system.

The first temperature sensor 111-1 may measure the temperature of the first steering control module 110. The first temperature sensor 111-1 may obtain first temperature information based on the measured temperature of the first steering control module 110. The first temperature sensor 111-1 may be connected to the first controller 114. The first temperature sensor may provide the obtained first temperature information to the first controller 114.

The first current sensor 111-2 may detect a first assist current between the first steering motor power supply unit 113 and the steering motor. The first current sensor 111-2 may obtain first assist current information based on the detected first assist current. The first current sensor 111-2 may be connected to the first controller 114. The first current sensor 111-2 may provide the first assist current information to the first controller 114.

The first motor position sensor 111-3 may detect the position of the steering motor. The first motor position sensor 111-3 may obtain first motor position information based on the detected position of the steering motor. The first motor position sensor 111-3 may be connected to the first controller 114. The first motor position sensor 111-3 may provide the first motor position information to the first controller 114.

The first communication unit 112 may include a first internal communication unit 112-1 and a first external communication unit 112-2.

The first internal communication unit 112-1 may be connected to the second internal communication unit 122-1 of the second steering control module 120 through the internal communication network 200. That is, the first internal communication unit 112-1 and the second internal communication unit 122-1 may be connected to each other through the internal communication network 200 so as to transmit and receive information between the first steering control module 110 and the second steering control module 120.

In addition, the first internal communication unit 112-1 may be connected to the first controller 114. That is, the first internal communication unit 112-1 may transmit information (e.g., operating state information of the second steering control module 120, etc.) provided from the second steering control module 120 to the first controller 114 through the internal communication network 200. In addition, the first internal communication unit 112-1 may transmits information (e.g., operating state information of the first steering control module 110, etc.) provided from the first controller 114 to the second internal communication unit 122-1 through the internal communication network 200.

The first external communication unit 112-2 may be connected to the vehicle through the first external communication network 210. That is, the first external communication unit 112-2 and the vehicle may be connected to each other through the first external communication network 210 to transmit/receive information on the first steering control module 110 and the vehicle. For example, the first external communication unit 112-2 may provide information (e.g., vehicle state information, etc.) received from the vehicle to the first controller 114 through the first external communication network 210. In addition, the first external communication unit 112-2 may transfer the information (e.g., operating state information of the first steering control module 110, etc.) provided from the first controller 114 to the vehicle through the first external communication network 210.

Here, the first internal communication unit 112-1 and the second external communication unit 112-2 may include at least one of wired and wireless communication units. In particular, the first internal communication unit 112-1 and the second external communication unit 112-2 may include a control area network (CAN) communicator, but are not limited thereto, and may include another communicator for connecting each steering control module and the vehicle to each other.

The first steering motor power supply unit 113 may include a first gate driver 113-1, a first inverter 113-2, a first phase disconnector or a first phase cut-off circuit (PCO) 113-3, and the like.

The first gate driver 113-1 may be connected to the first controller 114. The first gate driver 113-1 may receive a first gate signal from the first controller 114. In addition, the first gate driver 113-1 may be connected to the first inverter 113-2. The first gate driver 113-1 may provide the first gate signal received from the first controller 114 to the first inverter 113-2.

The first inverter 113-2 may be connected to the voltage supply module. The first inverter 113-2 may receive a first DC voltage from the voltage supply module. In addition, the first inverter 113-2 may be connected to the first gate driver 113-1. The first inverter 113-2 may receive a first gate signal from the first gate driver 113-1. The voltage supply module may supply voltage to operate the steering motor.

The first inverter 113-2 may be a DC-AC converter and modulate a first DC voltage provided from the voltage supply module according to the first gate signal provided from the first gate driver 113-1 so as to generate a first assist current.

The first inverter 113-2 may include a 3-phase inverter, but is not limited thereto, and may be modified according to a steering motor and a power source.

The first phase cut-off circuit (PCO) 113-3 may be connected to the first inverter 113-2. The first PCO 113-3 may receive the first assist current from the first inverter 113-2.

The first PCO 113-3 may supply or block the first assist current provided from the first inverter 113-2 through an on-off operation. That is, the first PCO 113-3 may be connected to the steering motor. The first PCO 113-3 may supply or block the first assist current received from the first inverter 113-2 to the steering motor.

Here, the PCO is an element or circuit capable of cutting off a phase, and may include at least one of a switch, a circuit breaker, a disconnector, and a switching unit, but is not limited thereto, and may include another element or circuit capable of cutting-off the phase.

As described above, the vehicle steering control device according to the present disclosure can separate each inverter through each PCO by sharing one steering motor through each PCO, thereby improving vehicle redundancy and reliability.

The first controller 114 may be connected to the first sensor unit 111, the first communication unit 112, the first steering motor power supply unit 113, a first controller monitoring unit 115, and a first power conversion unit 116. The first controller 114 may control the operation of the first sensor unit 111, the first communication unit 112, the first steering motor power supply unit 113, the first controller monitoring unit 115, and the first power conversion unit 116.

For example, the first controller 114 may generate a first gate signal based on the torque information of the steering wheel provided from at least one torque sensor, the steering angle information of the steering wheel provided from the at least one steering angle sensor, the first temperature information, first assist current information and first motor position information provided from the first sensor unit 111, and the vehicle state information (e.g., vehicle speed information) provided from the first communication unit 112. The first controller 114 may provide the generated first gate signal to the first gate driver 113-1 to control the first assist current of the first inverter 113-2.

Here, the first gate signal may be generated by a specific modulation method. In particular, the specific modulation method may include at least one voltage modulation method of a pulse width modulation (PWM) method, an optimal voltage modulation (OVM) method, a triangular comparison voltage modulation (TCVM) method, and a space vector voltage modulation (SVVM) method, but is not limited thereto, and may include another modulation method capable of generating a gate signal for controlling the operation of the inverter The first controller 114 may include a first micro controller unit (MCU) 114-1, but is not limited thereto, and may include another devices (or computers) capable of processing (or executing and calculating) programs.

The first controller monitoring unit 115 may be connected to the first controller 114. The first controller monitoring unit 115 may monitor an operating state of the first controller 114. For example, the first controller 114 may provide a first watchdog signal to the first controller monitoring unit 115. In addition, the first controller monitoring unit 115 may be cleared or generate a first reset signal based on the first watchdog signal provided from the first controller 114.

Further, if the first controller monitoring unit 115 is cleared, it may mean that the first controller 114 is operating normally. In addition, if the first controller monitoring unit 115 generates a first reset signal and provides it to the first controller 114, it may mean that the first controller 114 is operating abnormally, and the first controller 114 may be reset by a first reset signal.

Here, the first watchdog signal may be a signal (e.g., a signal preventing resetting) for the first controller monitoring unit 115 to periodically monitor the operation of the first controller 114. That is, the first watchdog signal may be a signal capable of confirming that a program currently being executed in the first controller 114 is alive.

The first controller monitoring unit 115 may include a first watchdog 115-1, but is not limited thereto, and may include any device capable of monitoring the first controller 114. In particular, the first watchdog 115-1 may include a first window watchdog with a deadline, that is, a start and an end.

The first power conversion unit 116 may be connected to a power supply module (not shown). The first power conversion unit 116 may receive a first DC voltage from the power supply module. The first power conversion unit 116 may generate at least one first operating voltage by converting the first DC voltage provided from the power supply module.

The first power conversion unit 116 may be connected to the first sensor unit 111, a first communication unit 112, a first steering motor power supply unit 113, a first controller 114, and a first controller monitoring unit 115. The first power conversion unit 116 may provide the generated at least one first operating voltage to the first sensor unit 111, the first communication unit 112, the first steering motor power supply unit 113, and the first controller 114, and the first controller monitoring unit 115.

Here, the first operating voltage may be a voltage capable of operating the first sensor unit 111, the first communication unit 112, the first steering motor power supply unit 113, the first controller 114 and the first controller monitoring unit 115. Accordingly, there may be a plurality of such first operating voltages, and the first operating voltage may be generated by being transformed according to the operating voltage of the first sensor unit 111, a first communication unit 112, a first steering motor power supply unit 113, a first controller 114 and a first controller monitoring unit 115

In addition, the first power conversion unit 116 may include a DC-DC converter. Here, the DC-DC converter may include a buck converter, but is not limited thereto, and may include another converter capable of receiving a first DC voltage and converting it into a first operating voltage lower than the received first DC voltage.

In addition, the first power conversion unit 116 may include a first regulator 116-1. Here, the first regulator 116-1 may receive the first DC voltage and convert it into a first operating voltage lower than the received first DC voltage.

Meanwhile, the second steering control module 120 may monitor the operating state of the first steering control module 110 which currently controls the steering motor through the internal communication network 200, and, if the operating state of the first steering control module 110 is abnormal as a result of the monitoring, may control the steering motor by using at least one of the second sensor unit 121, the second communication unit 122, the second steering motor power supply unit 123, the second controller 124, the second controller monitoring unit 125 and the second power conversion unit 126. That is, if it is determined that the first steering control module is in the abnormal state, the control right of the first steering control module may be transitioned or transferred to the second steering control module.

For example, the second steering control module 120 may monitor the operating state of the first steering control module 110 which currently controls the steering motor through the internal communication network 200. In addition, if the operating state of the first steering control module 110 is abnormal as a result of the monitoring, that is, if at least one of first motor position information, first temperature information, and first assist current information of the first sensor unit 111, vehicle state information from the first communication unit 112, and at least one of the first assist current of the first steering motor power supply unit 113, the first gate signal of the first controller 114, the first watchdog signal of the first controller monitoring unit 115 and the first operating voltages of the first power conversion unit 116 is abnormal, the second steering control module 120 may control the steering motor by using at least one of the second sensor unit 121, the second communication unit 122, the second steering motor power supply unit 123, the second controller 124, the second controller monitoring unit 125 and the second power conversion unit 126 for performing the same function of as the first sensor unit 111, the first communication unit 112, the first steering motor power supply unit 113, the first controller 114, the first controller monitoring unit 115 and the first power conversion unit 116, that is, by using at least one of second motor position information, the second temperature information, and second assist current information of the second sensor unit 121, vehicle state information from the second communication unit 122, and at least one of the second assist current of the second steering motor power supply unit 123, the second gate signal of the second controller 124, the second watchdog signal of the second controller monitoring unit 125 and the second operating voltages of the second power conversion unit 126.

When receiving an OTA update request, the first steering control module 110 may delete a stored first code flash and store an update file according to the OTA update.

In addition, if the first steering control module 110 receives the OTA update request, the second steering control module 120 may receive a control right from the first steering control module 110.

Figure 3:
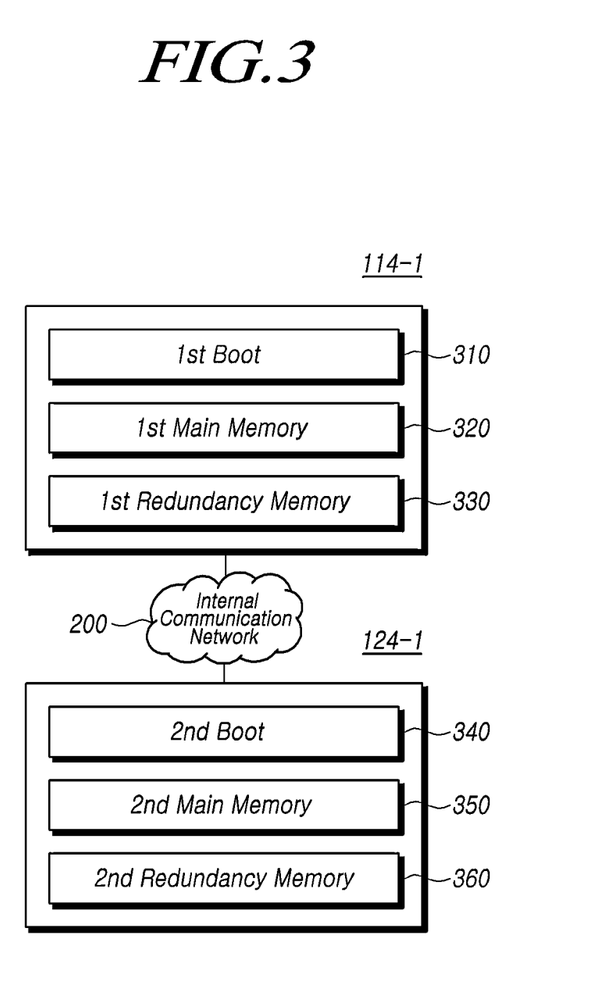
FIG. 3 is a block diagram illustrating an micro controller unit (MCU) in which an update file is stored according to an exemplary embodiment.

FIG. 3 is a block diagram illustrating a micro controller unit (MCU) in which an update file is stored according to an exemplary embodiment.

Referring to FIG. 3, a first MCU 114-1 may include a first boot 310, a first main memory 320, a first redundancy memory 330, and the like.

In addition, since the second MCU 124-1 has the same configuration as the first MCU 114-1, the second MCU 124-1 may include a second boot 340, a second main memory 350, and a second redundancy memory 360.

The first MCU 114-1 and the second MCU 124-1 may transmit and receive data through the internal communication network 200 with each other.

Hereinafter, it will be described only the configuration of the first MCU 114-1 for simplicity of description.

The first boot 310 may start up a computing system such as an MCU or perform initial setting. In addition, if an OTA update request is received, the first boot 310 may empty the memory and allow the update file to be stored.

A code flash area may be allocated in the first main memory 320, and a code flash including a register in charge of overall control of the steering control device 10 may be stored in the corresponding area. Here, the register may include registers for program control and operation, registers for controlling functions around the microprocessor, and the like.

The first redundancy memory 330 is a memory additionally allocated for the steering control device 10 according to the present disclosure to perform the OTA update in real time, and may store update files like the first main memory 320

Figure 4:
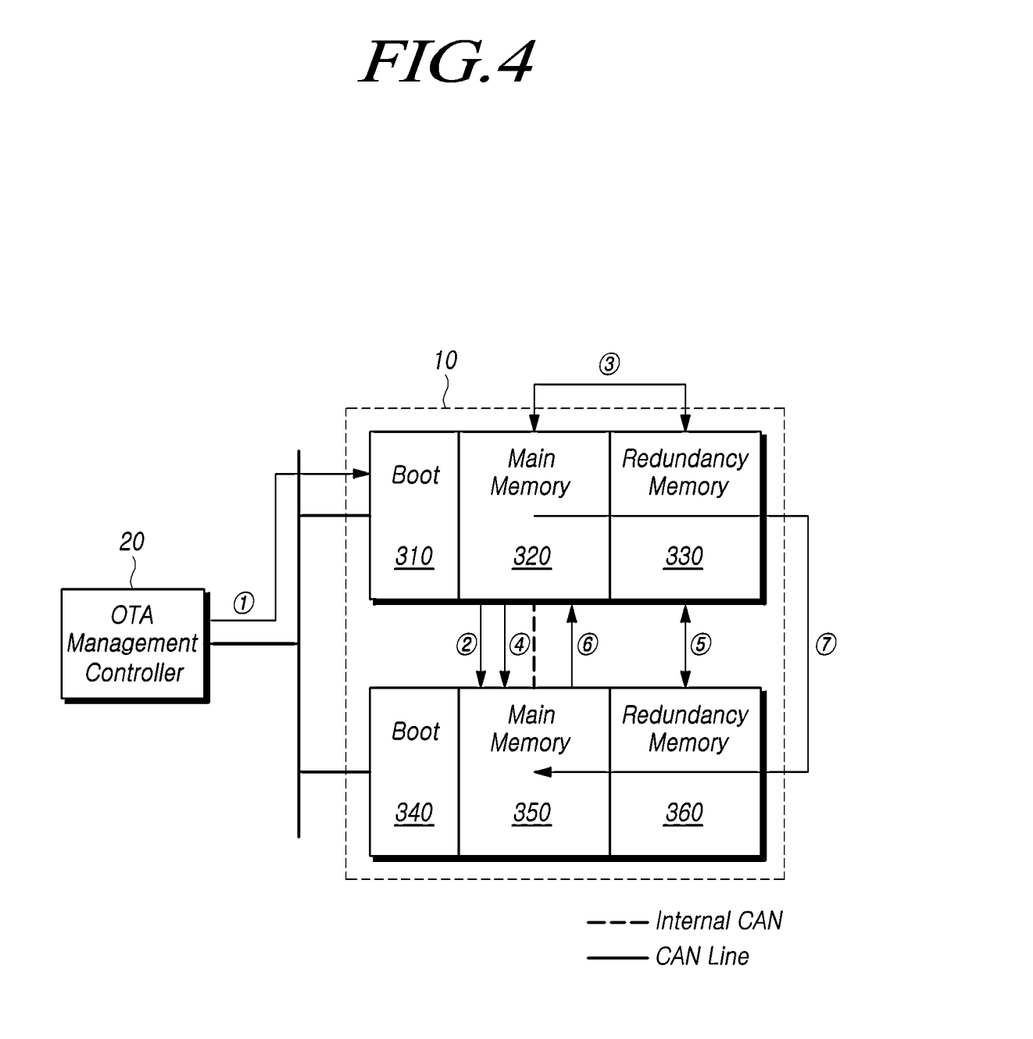
FIG. 4 is a diagram for explaining an OTA update performed by a steering control device according to an embodiment of the present disclosure.

FIG. 4 is a diagram for explaining an OTA update performed by a steering control device 10 according to an embodiment of the present disclosure.

Referring to FIG. 4, in ① of FIG. 4, the first steering control module 110 may receive an OTA update request from an OTA management controller 20. The OTA management controller 20 may download an update file for OTA update from the outside and store it in advance. If the OTA management controller 20 finishes or completes storing the update file, the OTA management controller 20 may request an update to the first steering control module 110.

In ② of FIG. 4, the first steering control module 110 may transition or transfer the control right to the second steering control module 120 upon receiving the OTA update request. In the case that the first steering control module 110 performs an OTA update, there may occur a blank in the control of the steering device since the existing code flash is deleted. Accordingly, the first steering control module 110 may transfer the control right of the steering device to the second steering control module 120 to maintain control of the steering device.

In ③ of FIG. 4, the first steering control module 110 may store the update file in the first redundancy memory 330 while downloading and storing the update file from the OTA management controller 20. That is, the update file may be stored in the first main memory 320 from which the code flash is deleted and the first redundant memory.

In ④ of FIG. 4, if the storage of the update file is completed, the first steering control module 110 may notify the second steering control module 120 of the fact of the completion of storing update file.

In ⑤ of FIG. 4, if the first steering control module 110 completes storing the update file, the second steering control module 120 may compare the files stored in the first redundancy memory 330 and the files stored in the second redundancy memory 360.

In ⑥ of FIG. 4, in the case that there is a change in the file stored in the first redundancy memory 330 and the file stored in the second redundancy memory 360, the second steering control module 120 may transmit changes to the first steering control module 110. In addition, the second steering control module 120 may transition the control right to the first steering control module 110 when the first steering control module 110 completes the OTA update. If the above-described changes are transmitted to the first steering control module 110, the second steering control module 120 may determine that the first steering control module 110 has completed the OTA update.

If there is no change in the above comparison, the second steering control module 120 may check the validity of the OTA update.

In ⑦ of FIG. 4, the first steering control module 110 may copy an update file to a second main memory 350 and a second redundancy memory 360. Specifically, the second steering control module 120 may delete a second code flash stored, store the update file in the second main memory 350, and store the update file in the second redundancy memory 360. Since the first steering control module 110 and the second steering control module 120 have the same configuration, there may be performed the copy of a value using a memory address.

According to embodiments of the present disclosure, the steering control device 10 of the present disclosure may compare the file stored in the first redundancy memory 330 with the file stored in the second redundancy memory 360, thereby more easily copying the update file to the steering control module 120.

In the above OTA update process, downloading an update file from the OTA management controller 20 may be performed through a controller area network (CAN) line inside the vehicle, however, is not limited thereto, and may be performed by another communication manner capable of transmitting information between devices inside the vehicle, such as the FlexRay method.

In addition, transmission and reception of information between the first steering control module 110 and the second steering control module 120 may be performed through an internal CAN or a private CAN.

In an embodiment, the first steering control module 110 and the second steering control module 120 may be implemented as an electronic control unit (ECU). The electronic control unit may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/nonvolatile storage media. For example, memory may include ROM and RAM.

Hereinafter, it will be described a steering control method using the steering control device 10 capable of performing all of the above-described present disclosure.

Figure 5:
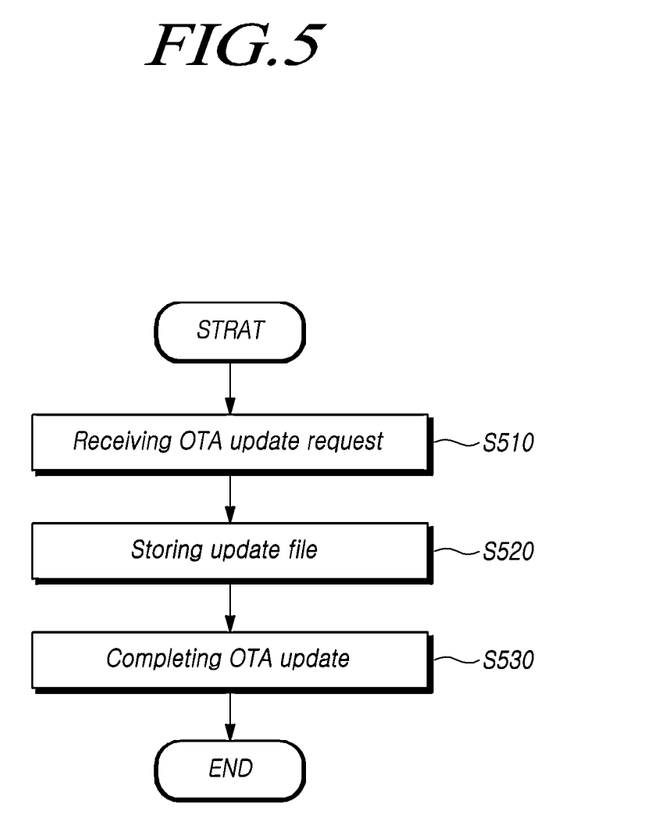
FIG. 5 is a flowchart illustrating a steering control method according to an embodiment of the present disclosure.

FIG. 5 is a flowchart illustrating a steering control method according to an embodiment of the present disclosure.

Referring to FIG. 5, a steering control method according to an embodiment of the present disclosure may include an OTA update request step of receiving the OTA update request by the first steering control module 110(S510), an update file storing step of transitioning the control right from the first steering control module 110 to the second steering control module 120, deleting the stored first code flash of the first steering control module 110, and storing the update file (S520), and an OTA update completion step of transitioning the control right from the second steering control module 120 to the first steering control module 110 when the first steering control module 110 completes the OTA update (S530).

Figure 6:
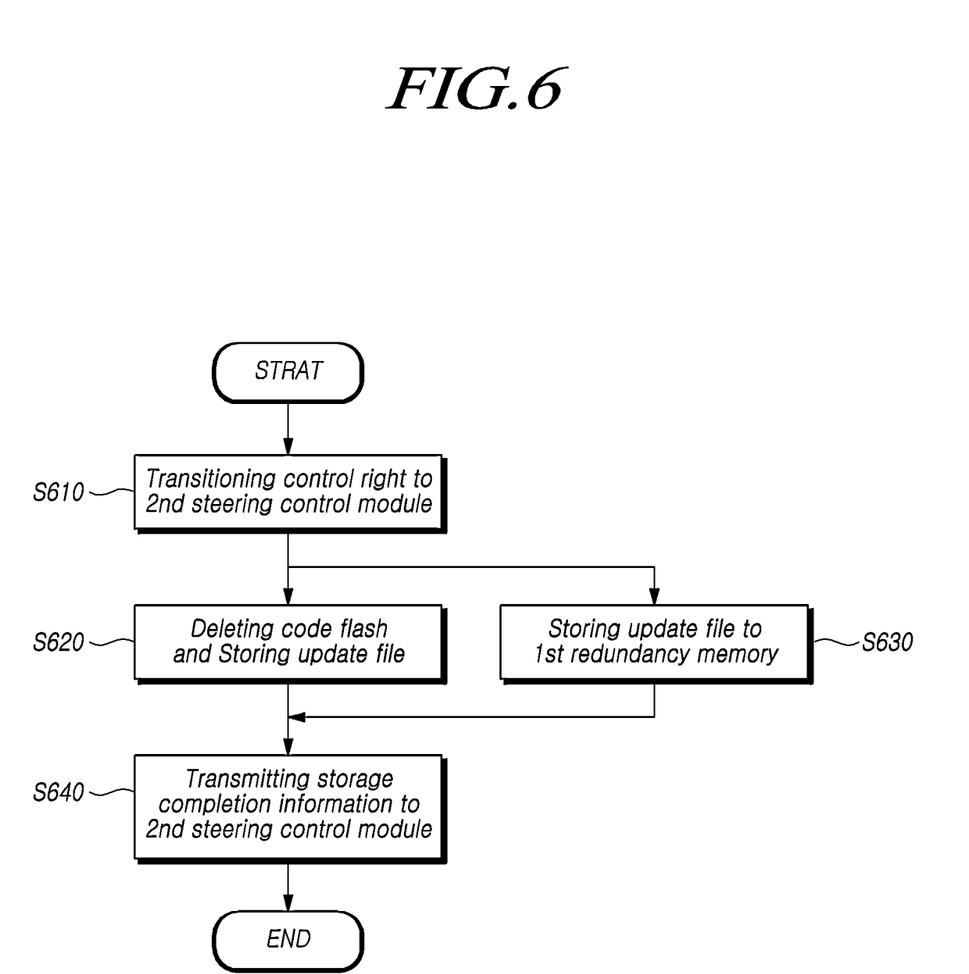
FIG. 6 is a diagram for explaining step S520 in more detail according to an embodiment.

FIG. 6 is a diagram for explaining step S520 in more detail according to an embodiment.

Referring to FIG. 6, when receiving an OTA update request, the steering control device 10 may transition a control right from the first steering control module 110 to the second steering control module 120 (S610). Here, the OTA update request can be received from the OTA management controller 20 connected to the inside of the vehicle through a CAN line.

The steering control device 10 may delete the first code flash and store the update file (S620). The first code flash may refer to an existing code flash stored in the first main memory 320, and the update file may be downloaded and stored in the first main memory 320.

The steering control device 10 may store the update file in the first redundancy memory 330 (S630). The steering control device 10 may simultaneously perform steps S630 and S620. That is, when an update file is downloaded, the update file may be stored in both the first main memory 320 and the first redundancy memory 330.

If the first steering control module 110 completes storing the update file, the steering control device 10 may transmit storing completion information to the second steering control module 120 (S640).

Figure 7:
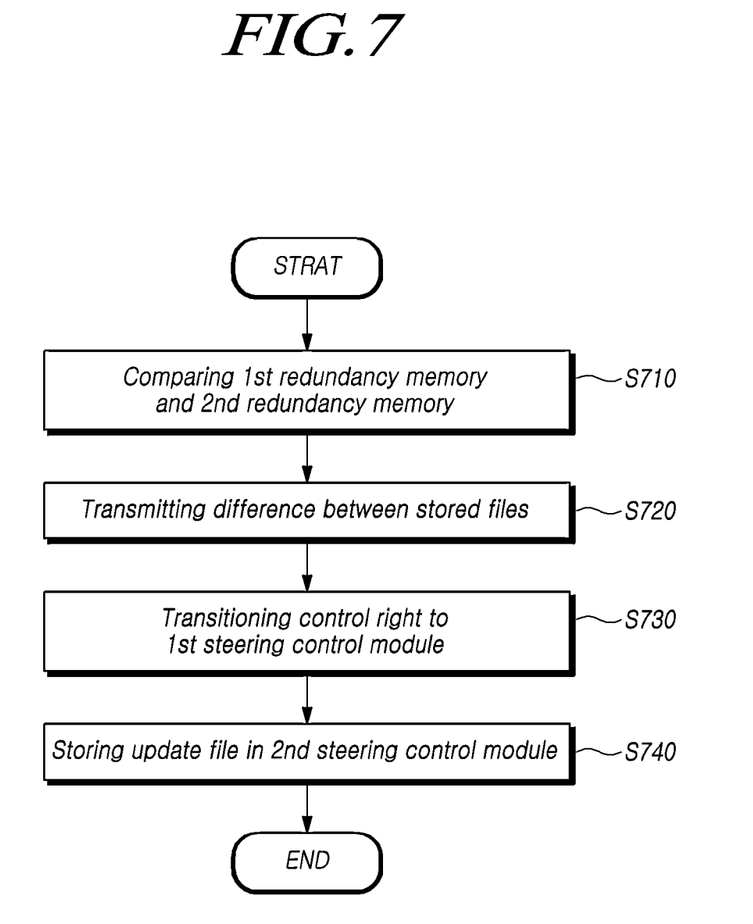
FIG. 7 is a diagram for explaining step S530 in more detail according to an embodiment.

FIG. 7 is a diagram for explaining step S530 in more detail according to an embodiment.

Referring to FIG. 7, if the first steering control module 110 completes storing the update file, the steering control device 10 may compare a file stored in the first redundancy memory 330 and a file stored in the second redundancy memory 360 (S710). In this case, the file stored in the second redundancy memory 360 may be a second code flash of the previous version, and the file stored in the first redundancy memory 330 may be an update file stored while performing OTA update, that is, a first code flash of the latest version.

If there is a change in the file stored in the first redundancy memory 330 and the file stored in the second redundancy memory 360, the steering control device 10 transfers the change to the first steering control module 110 (S720).

The steering control device 10 may receive the above-described changes, and if it is determined that there is no abnormality in the update, may determine that the OTA update has been completed, and may transition the control right from the second steering control module 120 to the first steering control module 110 (S730). For example, if a file stored in the first redundancy memory 330 and a file stored in the second redundancy memory 360 are the same, the steering control device 10 may determine that there is not performed the update to the latest version.

The steering control device 10 may store an update file in the second steering control module 120 (S740). The update file may be stored in both the second main memory 350 and the second redundancy memory 360.

As described above, according to embodiments of the steering control device and method according to the present disclosure, since the control right of the vehicle is maintained when an OTA update is performed, the update can be performed at any time regardless of the driving situation of the vehicle.

The above description has been presented to enable any person skilled in the art to make and use the technical idea of the present disclosure, and has been provided in the context of a particular application and its requirements.

Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device comprising:
    a first steering control module, which includes a first micro controller unit with a first main memory and a first redundancy memory, configured to delete a stored first code flash from the first main memory and store an update file into the first main memory and the first redundancy memory according to an over-the-air (OTA) update when receiving an OTA update request; and
    a second steering control module, which includes a second micro controller unit with a second main memory and a second redundancy memory, configured to receive a control right transitioned from the first steering control module, and store the update file into the second redundancy memory, if the first steering control module receives the OTA update request,
    wherein, if the first steering control module completes storing the update file, the second steering control module compares a file stored in the first redundancy memory with a file stored in the second redundancy memory, and
    wherein if there is a change in the file stored in the first redundancy memory and the file stored in the second redundancy memory, the second steering control module transitions the control right from the second steering control module to the first steering control module.

2. The steering control device of claim 1, wherein the second steering control module transitions the control right to the first steering control module if the first steering control module completes the OTA update.

3. The steering control device of claim 1, wherein, if there is a change in the file stored in the first redundancy memory and the file stored in the second redundancy memory, the second steering control module transmits the change to the first steering control module.

4. The steering control device of claim 1, wherein the first steering control module transmits and receives data with the second steering control module through an internal communication network.

5. The steering control device of claim 1, wherein the second steering control module deletes a stored second code flash, and stores the update file in the second redundancy memory.

6. A steering control method comprising:
    receiving, by a first steering control module including a first micro controller unit with a first main memory and a first redundancy memory, an over-the-air (OTA) update request;
    transitioning, by the first steering control module, a control right from the first steering control module to a second steering control module, and deleting a stored first code flash from the first main memory and storing an update file into the first main memory and the first redundancy memory; and
    receiving, by the second steering control module including a second micro controller unit with a second main memory and a second redundancy memory, the control right transitioned from the first steering control module, and storing the update file into the second redundancy memory, if the first steering control module receives the OTA update request,
    wherein storing an update file into the first main memory and the first redundancy memory comprises, if the first steering control module completes storing the update file, comparing a file stored in the first redundancy memory with a file stored in the second redundancy memory,
    wherein if there is a change in the file stored in the first redundancy memory and the file stored in the second redundancy memory, transitioning the control right from the second steering control module to the first steering control module.

7. The steering control method of claim 6, wherein storing an update file comprises, if there is a change in the file stored in the first redundancy memory and the file stored in the second redundancy memory, transmitting the change to the first steering control module.

8. The steering control method of claim 6, wherein the first steering control module transmits and receives data with the second steering control module through an internal communication network.

9. The steering control method of claim 6, wherein storing the update file into the second redundancy memory comprises deleting a stored second code flash, and storing the update file in the second redundancy memory.

* * * * *